United States Patent
Worth et al.

(10) Patent No.: US 6,889,664 B2
(45) Date of Patent: May 10, 2005

(54) ENGINE AIRFLOW MEASUREMENT

(75) Inventors: David Richard Worth, Shenton Park (AU); Richard Albert Woolford, Connolly (AU); Troy Bradley Epskamp, Kiara (AU); Andrrew Michael Tilmouth, Mount Hawthorn (AU)

(73) Assignee: Orbital Engine Company (Australia) PTY Limited, Balcatta (AU)

( * ) Notice: Subject to any disclaimer, the term of this patent is extended or adjusted under 35 U.S.C. 154(b) by 35 days.

(21) Appl. No.: 10/275,120

(22) PCT Filed: May 1, 2001

(86) PCT No.: PCT/AU01/00491

§ 371 (c)(1),
(2), (4) Date: Nov. 1, 2002

(87) PCT Pub. No.: WO01/83970

PCT Pub. Date: Nov. 8, 2001

(65) Prior Publication Data

US 2003/0154777 A1 Aug. 21, 2003

(51) Int. Cl.⁷ .......................... F02D 41/18; G01F 1/86; G01F 1/38
(52) U.S. Cl. ...................... 123/494; 73/118.2
(58) Field of Search ................... 123/478, 480, 123/494; 73/118.2; 701/103, 104

(56) References Cited

U.S. PATENT DOCUMENTS

| | | | |
|---|---|---|---|
| 4,125,015 A | * 11/1978 | Di Nunzio et al. | 73/118.2 |
| 5,003,950 A | 4/1991 | Kato et al. | 123/406.46 |
| 5,027,278 A | 6/1991 | Ohnari et al. | 701/105 |
| 5,408,872 A | 4/1995 | Nonaka | |
| 5,497,329 A | 3/1996 | Tang | 701/104 |
| 5,590,632 A | 1/1997 | Kato et al. | 123/480 |
| 5,889,205 A | 3/1999 | Treinies et al. | 73/118.2 |
| 6,138,504 A | * 10/2000 | Lewis et al. | 73/118.2 |

FOREIGN PATENT DOCUMENTS

| | | |
|---|---|---|
| EP | 0 261 473 A1 | 3/1988 |
| EP | 0 589 517 A1 | 3/1994 |
| EP | 639704 A1 | 2/1995 |

* cited by examiner

*Primary Examiner*—Tony M. Argenbright
(74) *Attorney, Agent, or Firm*—Rothwell, Figg, Ernst & Manbeck

(57) ABSTRACT

A method of measuring the airflow in an engine, the engine having an intake manifold, including:
  sampling the manifold absolute pressure in said intake manifold at a predetermined crank angle of the engine; and
  determining the airflow as a function of the pressure differential between atmospheric pressure and the manifold absolute pressure at said crank angle.

31 Claims, 8 Drawing Sheets

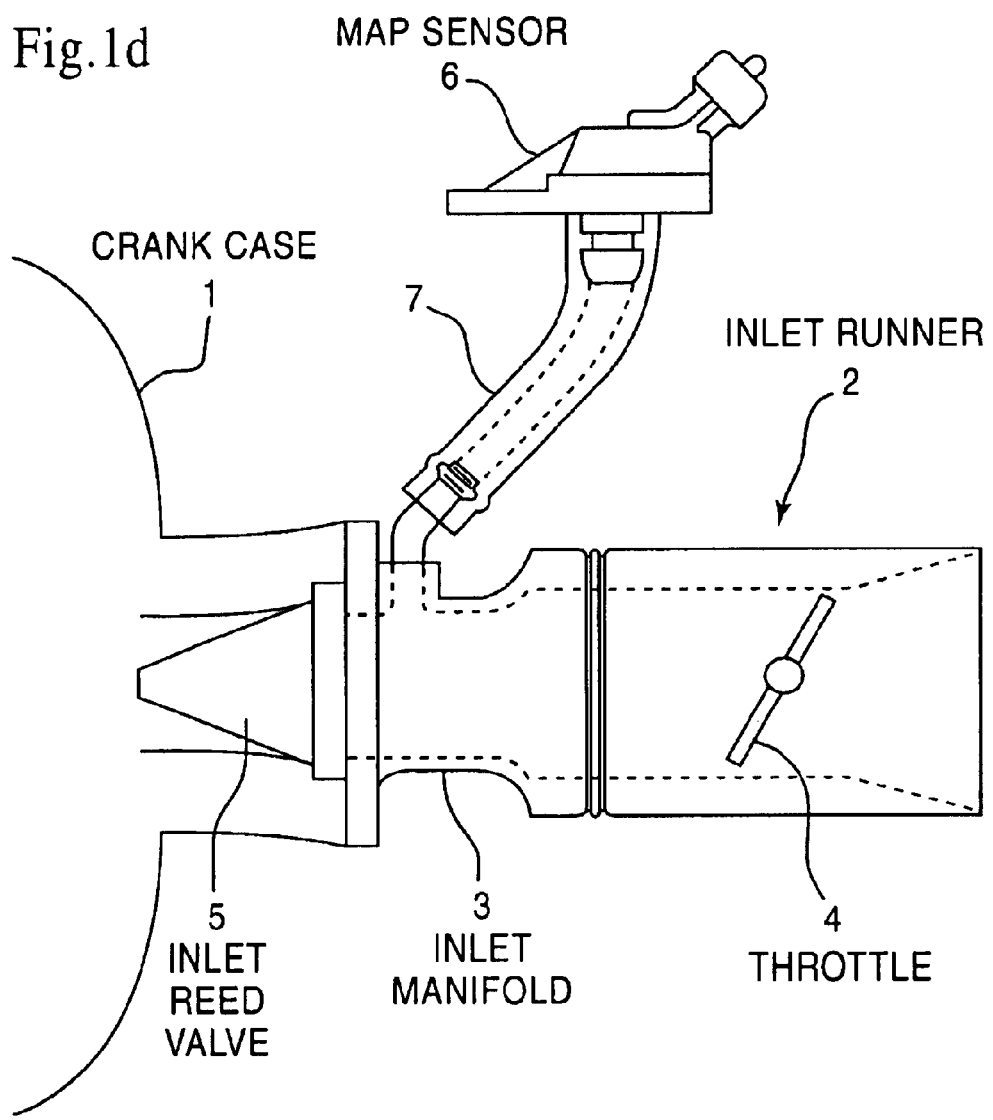

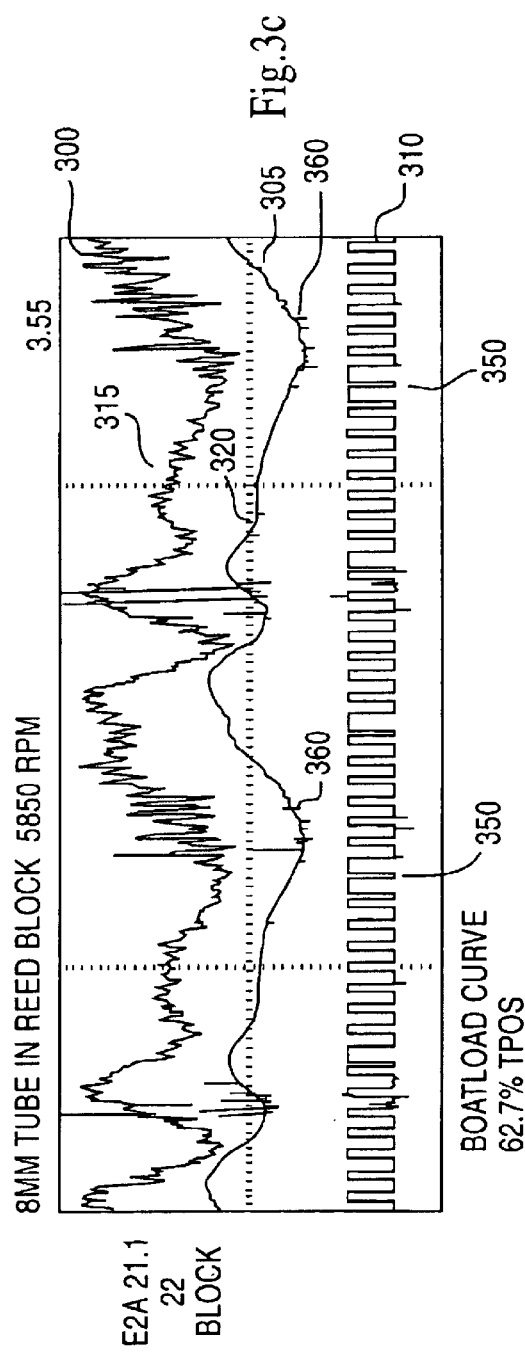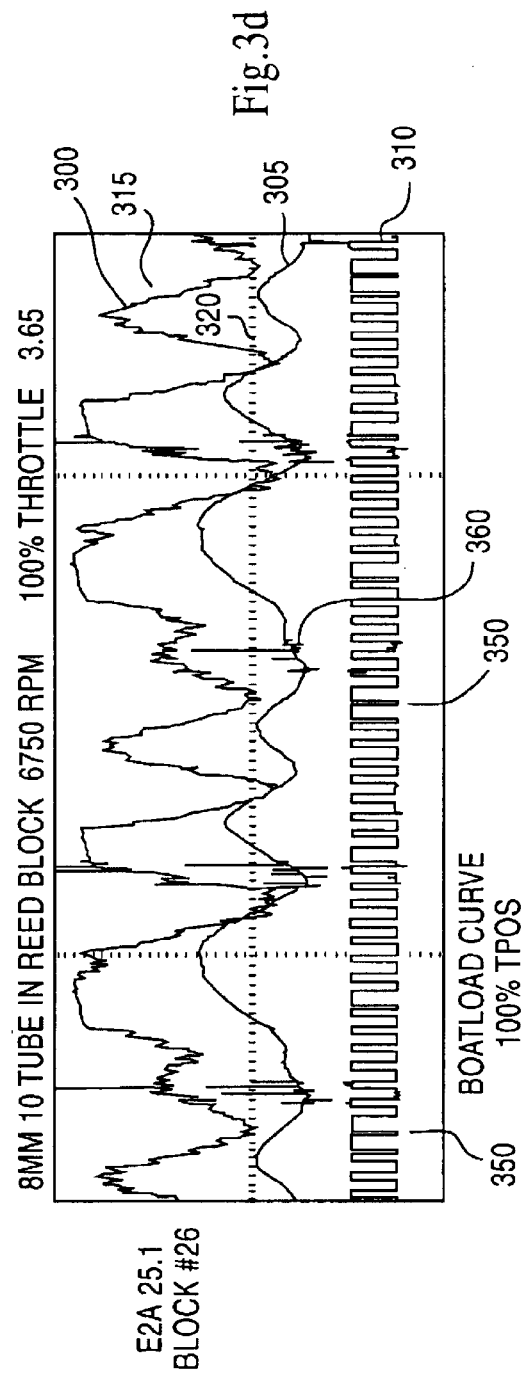

ENGINE AIRFLOW MEASUREMENT

The present invention is directed to a method of measuring a quantity of air delivered to an internal combustion engine. In particular it is directed to measuring a quantity of air delivered to an engine with a small inlet manifold volume. Although the invention will, in the main, be described with respect to two-stroke engines, it is to be appreciated that the invention is also applicable for four-stroke engines.

Internal combustion engines draw a quantity of air into their combustion chambers in order to facilitate combustion of fuel. This quantity of air is commonly referred to as the "airflow" or "mass air flow" to the engine.

One commonly known way of determining the airflow to an engine is by determining the average absolute pressure within an air intake manifold of the engine. The mass airflow rate can be calculated as a function of this average pressure. A sensor known as a Manifold Absolute Pressure (MAP) sensor is typically used to measure this average pressure. Such an arrangement is commonly used, for example, on marine engines where the corrosive salt ladened environment will rapidly destroy a hot-wire type mass flow sensor.

In multi cylinder engines, and other engines having an intake manifold with a relatively large internal volume, the manifold absolute pressure can be relatively consistent, and hence not vary significantly, when measured on a time basis or when measured over a number of engine cycle. This allows the mass air flow rate to be determined as a function of the average manifold absolute pressure, such as where this average is calculated from measurements made a number of times in one engine cycle or even over a number of engine cycles.

In contrast the manifold absolute pressure can vary significantly over an engine cycle, for smaller engines, such as single cylinder engines, engines having an intake manifold with a relatively small internal volume, or engines with an inlet manifold consisting of separate inlet runners and no common volume between these runners upstream of the cylinder block. This is because the pressure fluctuations within the intake manifold are influenced by the size of the manifold relative to the swept volume of the combustion chamber (ie the volume of air drawn through the manifold during an intake stroke of a cylinder). Typically a manifold whose volume is less than one or two swept volumes of the combustion chamber is regarded as a small manifold.

In some applications, the pressure fluctuations in the inlet manifold are such that the average pressure in the intake manifold is close to atmospheric pressure. Where this average is less than the resolution of the MAP sensor, the measurement of average absolute pressure may be unreliable. This is particularly true in high output two stroke engines with high airflow rates and small inlet volumes. Alternatively, time based sampling of manifold absolute pressure is not guaranteed to provide a measurement of average manifold pressure over an engine cycle where high pressure fluctuations occur over an engine cycle.

Accordingly, because of the high fluctuations in intake manifold pressure and/or because the average pressure in the intake manifold is close to atmospheric, conventional techniques for measuring engine air flow as a function of average intake pressure often are not reliable.

With this in mind, there is provided a method of measuring the air flow in an engine, the engine having an intake manifold, including:

sampling the manifold absolute pressure in said intake manifold at a predetermined crank angle of the engine; and determining the airflow as a function of the pressure differential between atmospheric pressure and the manifold absolute pressure at said crank angle.

Particular application may be found for this method in engines with high output and hence high air flow characteristics, engines with small inlet manifold volumes, engines employing inlet manifolds with independent inlet runners and hence no common volume upstream of the cylinder block and also single cylinder engines. It has been found that although the pressure fluctuations can be very high and relatively erratic in these types of engines when viewed on a time basis, the actual pressure cycle in the intake manifold is generally repeatable when viewed on an engine cycle basis (ie when viewed with respect to the crank angle of the engine). In other words, the pressure fluctuations in an inlet manifold tend to vary in a relatively uniform way as a function of the engine crank angle. To this end, it is possible to determine a crank angle at which the differential between atmospheric pressure and manifold absolute pressure is likely to be relatively high. The manifold absolute pressure is then preferably measured at this crank angle. It should be noted that the crank angle of measurement may vary with both engine speed and throttle position. The resultant differential pressure is typically greater than that of the average manifold pressure leading to greater accuracy in the air flow determination.

It is therefore possible to maximise the determined pressure differential thereby avoiding measurement of an average manifold pressure that is within the resolution limits of the sensor.

The manifold absolute pressure may preferably be measured at or near the maximum pressure fluctuation from atmospheric pressure within the intake manifold. This may for example occur at or near top dead centre.

The mass airflow rate may then be determined by the following equation:

$$\text{Mass Air} = \frac{PMAN2 \times VCF \times N}{PATM \times (TMAN + 273) \times R \times 10}$$

where:

Mass Air=mass airflow rate (g/s);
PMAN=manifold absolute pressure (kPa)
PATM=atmospheric pressure (kPa);
N=engine speed (RPM);
TMAN=manifold temperature (Co);
R=universal gas constant=287;
VCF=volume correction factor.

The mass airflow rate may be determined within an Electronic Control Unit (ECU) of the engine, and the volume correction factor (VCF) may be obtained from a "VCF map" (ie a look-up table) provided by the ECU. The VCF map may plot VCF against engine speed and engine throttle angle. The VCF map also take into account the fact that the manifold absolute pressure is measured at a preset engine crankangle.

Where the method according to the present invention is applied to a two-stroke internal combustion engine having an inlet manifold with reed valve downstream of a throttle valve the manifold absolute pressure sensor may be located on the engine so as to be in fluid communication with the intake manifold between the reed valve and throttle valve of the engine.

The method according to the present invention allows for more accurate determination of the mass air flow rate to the engine without adding to the complexity of the engine control system.

According to a further aspect of the present invention there is provided an internal combustion engine having an intake manifold said engine adapted to in use:

sample the manifold absolute pressure in said intake manifold at a predetermined crank angle of the engine; and determine the airflow as a function of the pressure differential between atmospheric pressure and the manifold absolute pressure at said crank angle.

According to a further aspect of the present invention there is provided an electronic control unit (ECU) for an internal combustion engine having an intake manifold and a manifold absolute pressure sensor; said ECU adapted to:

sample the manifold absolute pressure in said intake manifold at a predetermined crank angle of the engine; and determine the airflow as a function of the pressure differential between atmospheric pressure and the manifold absolute pressure at said crank angle.

It will be convenient to further describe the invention by reference to the accompanying drawings which illustrate preferred embodiments of the present invention. Other embodiments are possible, and consequently, the particularity of the accompanying drawings is not to be understood as superceding the generality of the preceding description of the invention.

Preferred arrangements will now be described, by way of example only and with reference to the accompanying drawings in which:

FIG. 1d is a schematic representation of an inlet runner of a high output two stroke engine suitable for use with the personal watercraft of FIG. 1c.

FIG. 3c is a representative graph plotting inlet manifold pressure of the engine of FIG. 3b at 5850 RPM and 62.7% throttle angle; and FIG. 3d is a representative graph inlet manifold pressure of the engine of FIG. 3b at 6750 RPM and 100% throttle angle.

To better under stand the environment in which the embodiments are employed, FIG. 1a to FIG. 1e will now be described.

Figure 1A:
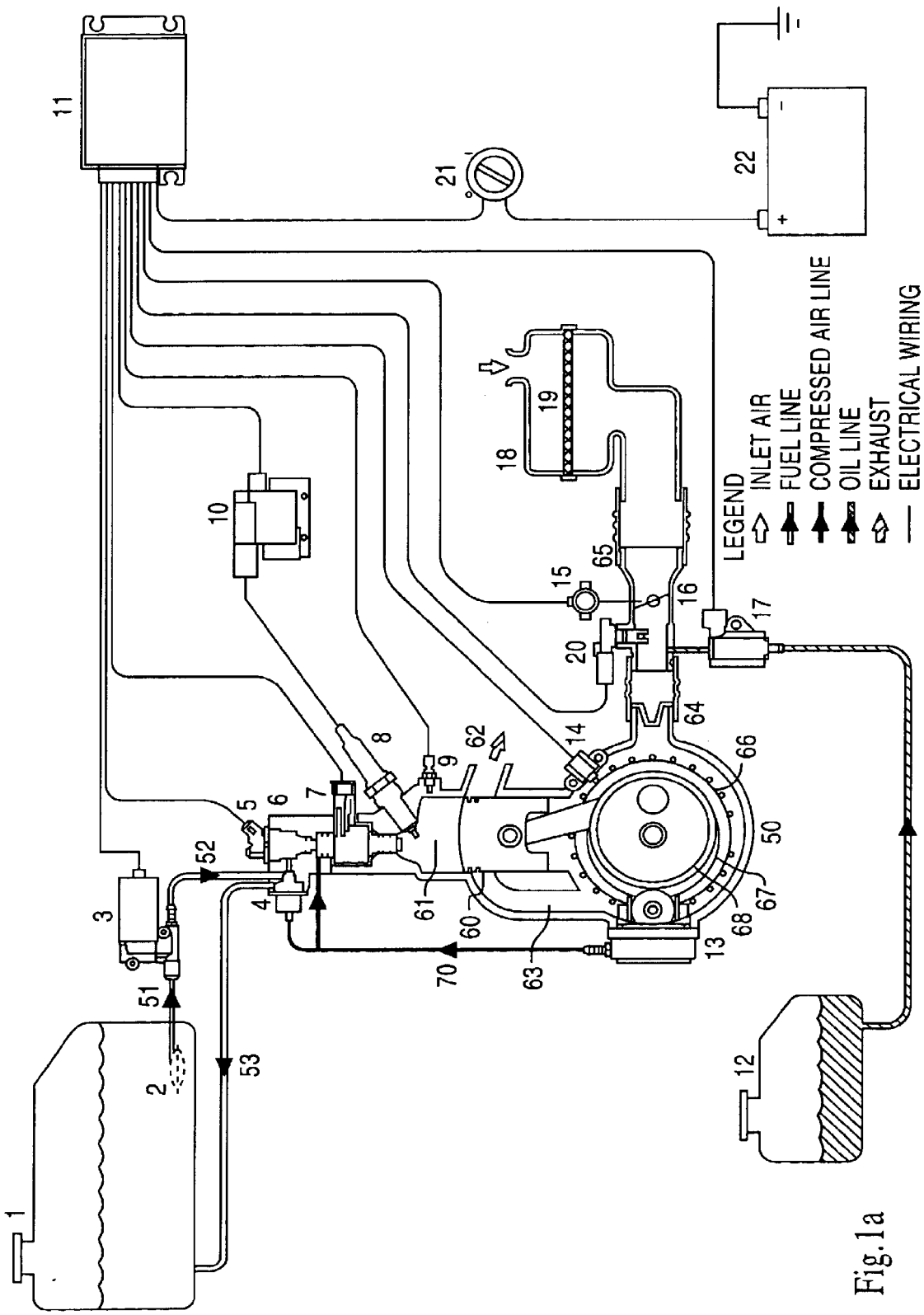
FIG. 1a is a schematic representation of a direct injection two stroke engine having a manifold absolute pressure sensor that is used for measuring air flow to the combustion chamber of the engine.

Referring initially to FIG. 1a, there is shown a schematic representation of a direct injected single cylinder two stroke engine 50 having a fuel tank 1 which communicates fuel to a fuel injector 5 by means of a fuel pump 3, fuel filter 2, fuel pressure regulator 4 and fuel supply line 52 and fuel return line 53. The fuel injector 6 meters fuel to a fuel delivery injector 7 in accordance with metering signals received from engine control unit (ECU) 11. The fuel delivery injector 7 is in fluid communication with compressed air via air supply circuit 70 that receives compressed air from air compressor 13. The fuel delivery injector 7 uses compressed air as a propellant to deliver fuel metered by the fuel injector 5 to combustion chamber 61 of engine 50. Further examples of fuel systems of this type may be found in the Applicant's U.S. Pat. No. 4,693,224 and U.S. Pat. No. 4,934,329 which are incorporated herein by reference. The compressor 13 is driven by a roller follower mechanism activated by an eccentric cam 68 on flywheel 67.

The fuel delivery injector 7 delivers a spray of fuel to the combustion chamber 61 in a manner so that the fuel passes across a spark gap of spark plug 8. The spark plug is controlled by ignition coil 10 which in turn is activated by ECU 11. Under certain engine operating conditions, which are typically low to medium load and low to medium speed conditions, the engine 50 operates by establishing a stratified charge of fuel in the combustion chamber which is ignited by spark plug 8. Preferably the spark plug ignites the fuel spray as it issues from the fuel delivery injector 7 so as to provide a spray guided combustion system.

Airflow is provided to the combustion chamber 61 via air box 18 and air filter 19. The air box is in fluid communication with an inlet manifold 65 intermediate throttle 16 and inlet reed valves 64. Located within the inlet manifold 65 is a combined manifold absolute pressure (MAP) sensor and temperature sensor 20 (TMAP sensor 20 ). The TMAP sensor 20 provides MAP signals to ECU 11 that indicate absolute pressure in the inlet manifold 65 and similarly provides a temperature signal to the ECU 11 that indicates the temperature of air entering the engine 50. The TMAP sensor 20 may be an analogue sensor whose signals may be sampled by ECU 11 through use of analogue to digital conversion techniques and digital filtering detailed below. It should be appreciated that alternate arrangements could use a discrete MAP sensor and a discrete temperature sensor rather than a combined TMAP sensor.

Air flow to the engine is in part controlled by the position of throttle 16. This position is indicated to ECU 11 by throttle position sensor 15.

Oil is supplied to the engine 50 by oil pump 17 which is controlled by ECU 11 and which receives oil from oil tank 12.

Electrical power is supplied to the engine, at least at cranking, by battery 22 and ignition switch 21.

The ECU 11 receives information as to the position of piston 60 within the combustion chamber 61 by crank shaft position sensor 14 and an encoder wheel 66 mounted on fly wheel 67. Encoder wheel 66 comprises a number of teeth, typically 24 (one of which may be missing so as to provide a reference tooth) which pass by position sensor 14. The teeth interact with position sensor 14 so as to generate a square wave signal as input to ECU 11. The square wave is commonly edge detected by the ECU 11 resulting in detection of each leading edge of an encoder wheel tooth as it passes position sensor 16.

The information as to the position of the piston 60 within combustion chamber 61 is commonly referred to as the engine's crank angle. A two stroke engine is said to have 360° of crank angle in an engine cycle whereas a four stroke engine is said to have 720° of crank angle in an engine cycle. Thus in operation an engine's crank angle corresponds to the instantaneous position of the engine within its current engine cycle. This position is measured relative to the engines top dead center position, which for a two stroke engine is the point of maximum compression on any engine revolution and for a four stroke engine is the point of maximum compression on an intake (i.e. compression) stroke, which is often referred to as "TDC firing". A 24 tooth encoder provides 15° of crank angle resolution for both a two stroke and a four stroke engine.

Figure 1B:
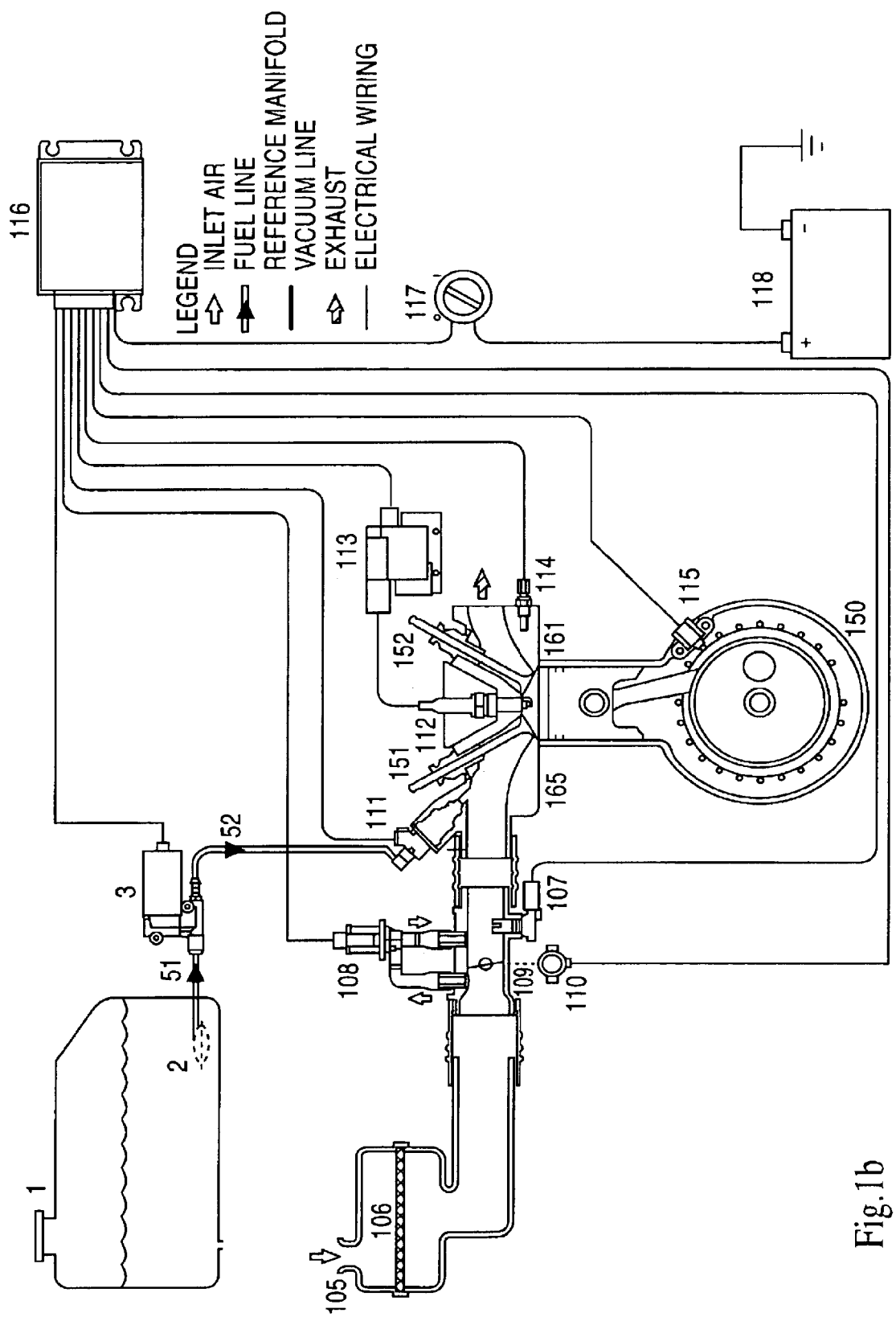
FIG. 1b is a schematic representation of a port injected four stroke engine having a manifold absolute pressure sensor that is used for measuring air flow to the combustion chamber of the engine.

FIG. 1b is a schematic representation of a single cylinder four stroke port injected engine 150. Similar to the two stroke engine 50 of FIG. 1a, the four stroke engine 150 has a fuel tank 1 that communicates fuel to a fuel injector 111 under control of an ECU 116 via a fuel pump 3 that draws fuel from the fuel tank 1 via fuel filter 2 and fuel supply line 51. The fuel pump 3 supplies fuel to fuel injector 111 via fuel supply line 52. A fuel pressure regulator and return line (not shown) may be formed integrally with the fuel pump 3, alternatively a fuel pressure regulator may be located in association with fuel injector 111 and a return line may return fuel to the tank from the regulator. Air is inlet to the combustion chamber 161 via air box 105, that houses air filter 106, and is also inlet via manifold 165 which is intermediate a throttle 109, and air inlet valve 151. The inlet manifold 165 houses a TMAP sensor 107, a throttle air bypass valve 108 and fuel injector 111.

Air inlet valve 151 is actuated under operation of a cam (not shown) so as to communicate air in the inlet manifold with the combustion chamber. Fuel injector 111 sprays fuel into the inlet air so that a homogenous charge of fuel is formed within combustion chamber 161. Spark plug 112 operates under the control of ignition coil 113 which is in turn controlled by ECU 116. An exhaust valve 152 is actuated under operation of a cam to permit egress of combustion gasses from the combustion chamber on an exhaust stroke. An engine temperature sensor 114 indicates engine temperature to the ECU 116.

The engine 150 has an engine position sensor 115 and corresponding encoder wheel 166 for indicating the engine's instantaneous crank angle when operational.

The engine 150 is supplied electrical power, at least at cranking, by means of a battery 118 and an ignition switch 117.

Figure 1C:
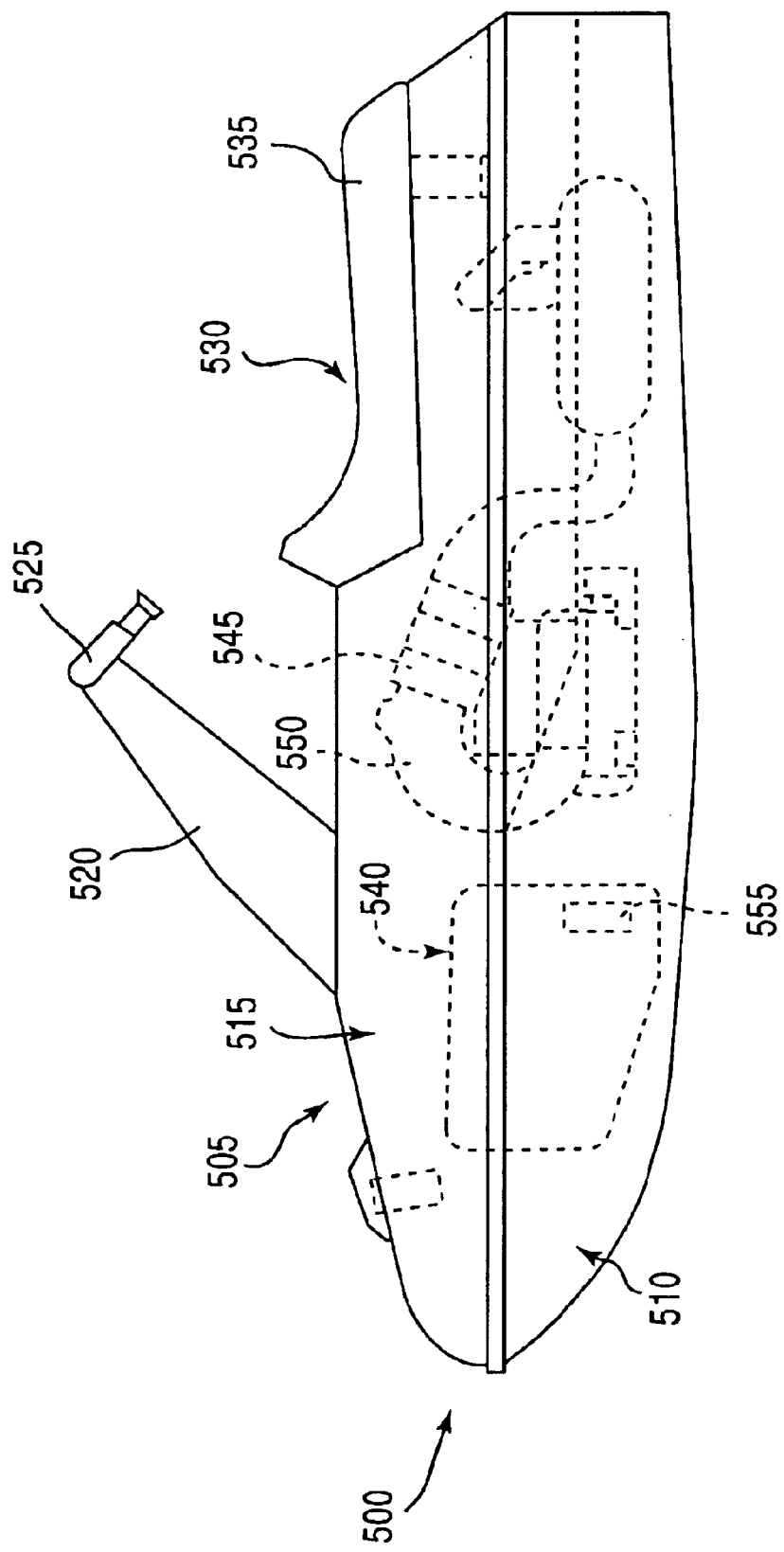
FIG. 1c is a schematic representation of a personal watercraft having a high output engine with individual inlet runners to each cylinder.

Referring now to FIG. 1c which is a schematic representation of an exemplary personal watercraft 500 having a high output two cylinder two stroke engine 550, which may be a crankcase scavenged engine, with separate inlet runners to each cylinder. There is a throttle in each inlet runner and the two inlet runners do not have a common volume upstream of the throttles.

The personal watercraft 500 consists of a hull 505 having a lower hull portion 510 and an upper hull portion 515 that may be affixed together by any suitable means. The hulls may be constructed from material, such as, for example, fiberglass reinforced resin. The upper hull consists of a column 520 that locates a handle bar arrangement 525 and instrument panel and ignition switch and start switch. The handle bar arrangement has mechanical throttle actuation means which may be actuated by the riders hand. Reward of the column 520 is located a rider area 530 that has a seat 535 mounted longitudinally on the upper hull 515. A rider and up to two passengers may locate themselves on the rider's area 530 by straddling the seat 535.

The upper hull 515 and the lower hull 510 define a cavity within which is located a fuel tank 540 mounted toward the bow of the hull 550. The fuel tank locates a fuel pump 555. An engine 550 is mounted rearwardly of the fuel tank 540 and has exhaust system 545. The engine 550 is a high output two cylinder fuel injected two stroke engine and has separate inlet runners to each cylinder. The fuel system to the engine may be a direct injection fuel system of the type detailed above in relation to FIG. 1a.

As depicted in FIG. 1d each inlet runner 560 has an inlet manifold 565 located intermediate a throttle 570 and an inlet reed valve 575. The inlet reed valve arrangement permits ingress of air into the crankcase 580 of the engine 550.

Figure 1E:
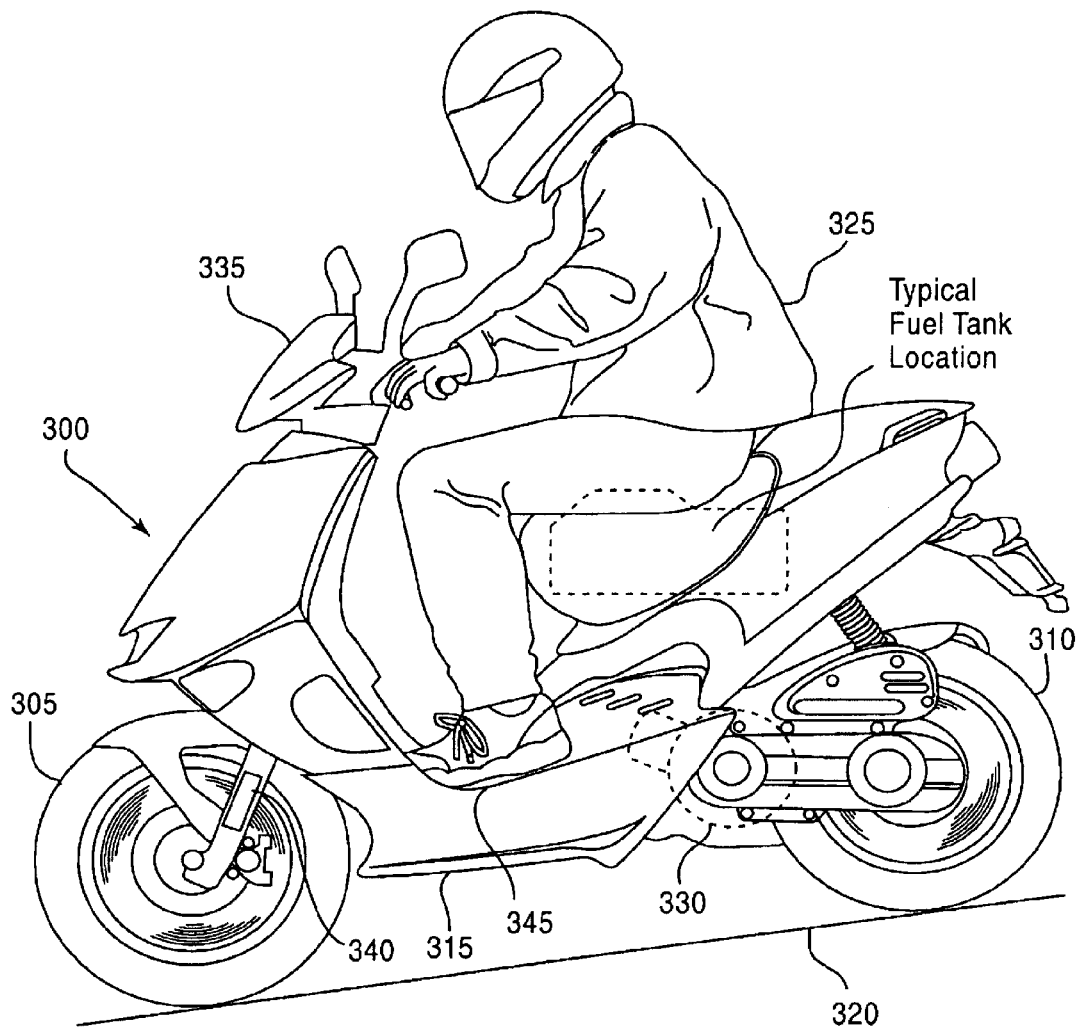
FIG. 1e is a schematic representation of a scooter having an engine with a small inlet manifold and employing an engine of the type depicted in either one of FIGS. 1a or 1b.

Referring now to FIG. 1e which is a schematic illustration of a scooter employing either a two stroke engine or a four stroke engine having a small inlet manifold. The scooter has a front wheel 305 and a rear wheel 310 which support a chassis and associated panel work 315 off of a road surface 320. The chassis and panel work 315 comprises a rider area 325 which typically consists of a seat that is capable of supporting two riders. The rider area 325 is located above the rear wheel 310 and an engine and associated drive mechanism 330. Handle bars 335 are pivotally mounted to the chassis and panel work 315 and further support shock absorbers 340 that located the front wheel 305 onto the scooter 300.

In operation a rider positions themselves onto the rider area and locate their feet on foot rests 345 located on a floor pan 350 of the chassis and associated panel work 315. The foot rests 345 are located intermediate the base of handle bars 335 and the rider area 325. The handle bars 335 contain a mechanical throttle actuation mechanism which may be actuated by the rider rotating their hand. The handle bars 335 also contain an ignition switch which activates an electrical circuit between a battery, located adjacent the engine and associated drive mechanism 330, and an electronic control unit and other electrical components, such as a fuel pump and headlights 355.

The scooter has a single cylinder fuel injected engine which may be of the type depicted either in FIG. 1a or 1b. The engine has a small capacity which may be in the range of 50 CC to 100 CC though utilisation of an increased capacity engine is also possible. A fuel tank (not shown) supporting an in-tank pump may be located underneath the riders area 325. The in-tank pump supplies fuel to a fuel supply circuit that is in communication with a fuel injector of the engine.

The engine has a small inlet manifold intermediate a throttle and an inlet valve to the engine. A combined temperature and MAP sensor is located within the inlet manifold.

MAP sensors are typically used on fuel injected engines to determine the rate of airflow to the engine by reference to the average inlet manifold absolute pressure over one or more engine cycles. In contrast, present embodiments sample the output of such a MAP sensor 20, 107 at predetermined crank angles, having regard to engine operating conditions, such as engine speed and throttle position, in order to determine air flow to the engine.

Once the rate of airflow to the engine has been determined through use of the MAP sensor 20, 107, an engine employing an air led control strategy can determine the quantity of fuel required to be metered by the fuel injectors 5, 111. Determination of fuelling levels in this manner is referred to as an air led control strategy as the quantity of fuel delivered to the engine is determined by the quantity of air flowing into the engine combustion chamber 61, 161.

The direct injection engines depicted in FIG. 1a which may be referred to as an "air assisted direct injection engine" delivers a stratified charge of fuel to the combustion chamber of the engine at low and medium loads. A Stratified charge is a non-homogenous charge of fuel within the combustion chamber 61. The engine may also be referred to as a "lean burn" engine as the total air fuel ratio within the combustion chamber may be substantially less than the stoichiometric ratio, however the air fuel ratio local to the stratified charge may be substantially higher so as to form an ignitable mixture. The stratified charge engine may calculate airflow to the combustion chambers in order to avoid rich and lean mis-fire events and to also enable air led control strategies to be employed at higher loads.

The scooter of FIG. 1e and the personal watercraft of FIG. 1c may utilise either the two-stroke or four stroke engines of FIGS. 1a and 1b and also utilise small inlet manifold volumes. An inlet manifold is typically said to be small when its volume is less than one or possibly two swept volumes of the combustion chamber. Direct injection engines and port injected engines with small inlet manifolds have not always measured engine airflow due to the problems referred to herein. However higher performance and/or further reductions in "engine out" emissions can be derived by these direct injection and manifold port injected engines through calculation of air flow.

Generally MAP sensors are located on an inlet manifold, which is typically regarded as the region downstream of a throttle and upstream from an engine inlet valve, such as the reed valve 64 on the two-stroke engine 50 or an inlet poppet valve on the four-stroke engine 150. This helps to minimise oil contamination of the MAP sensor as would be likely to occur if the MAP sensor was to measure crank case pressure.

Where an engine has two or more inlet runners that do not have a common volume upstream of the cylinder block (in such applications each inlet runner will typically have its own throttle body) a MAP sensor may be provided on each of the runners, although a single MAP sensor located on only one of the runners could alternatively be used.

The present embodiments sample the out-put of a MAP or TMAP sensor 20, 107 in the crank domain. This means that the TMAP sensor 20, 107 is sampled at a known point in an engine's cycle, such as 90 degrees before top dead centre firing. This sampling in the crank domain makes use of the pressure fluctuations in the inlet manifold 65, 165 having a relatively stable wave form on a cycle to cycle basis. These pressure waves may vary for different engine speeds and throttle angles however they have been found to be generally repeatable on a cycle to cycle basis for various operating conditions across the speed load range. The pattern of the pressure fluctuations in the inlet manifold is relatively stable on a cycle to cycle basis because the inlet valve(s) 64, 151 to an engine typically open to allow air induction at around the same crank angle each cycle of the engine, regardless of engine speed. Hence, the point for sampling the MAP sensor 20, 107 output can be selected as a point in the engine's cycle that provides a pressure within the operating range of the MAP sensor. If the point selected corresponds with a pressure that is at or near a limit of operation of the MAP sensor, the output of the sensor may not always be reliable or accurate. An alternative approach is to determine a table of optimum sample points for TMAP sensor 20, 107 for various engine speeds and/or throttle angles.

The point selected for sampling the MAP sensor 20, 107 output can maximise the absolute pressure measured by the MAP sensor. This avoids sensitivity problems that can arise with some MAP sensors where average absolute pressure in the inlet manifold is within the sensors limit of resolution relative to atmospheric pressure.

Figure 2:
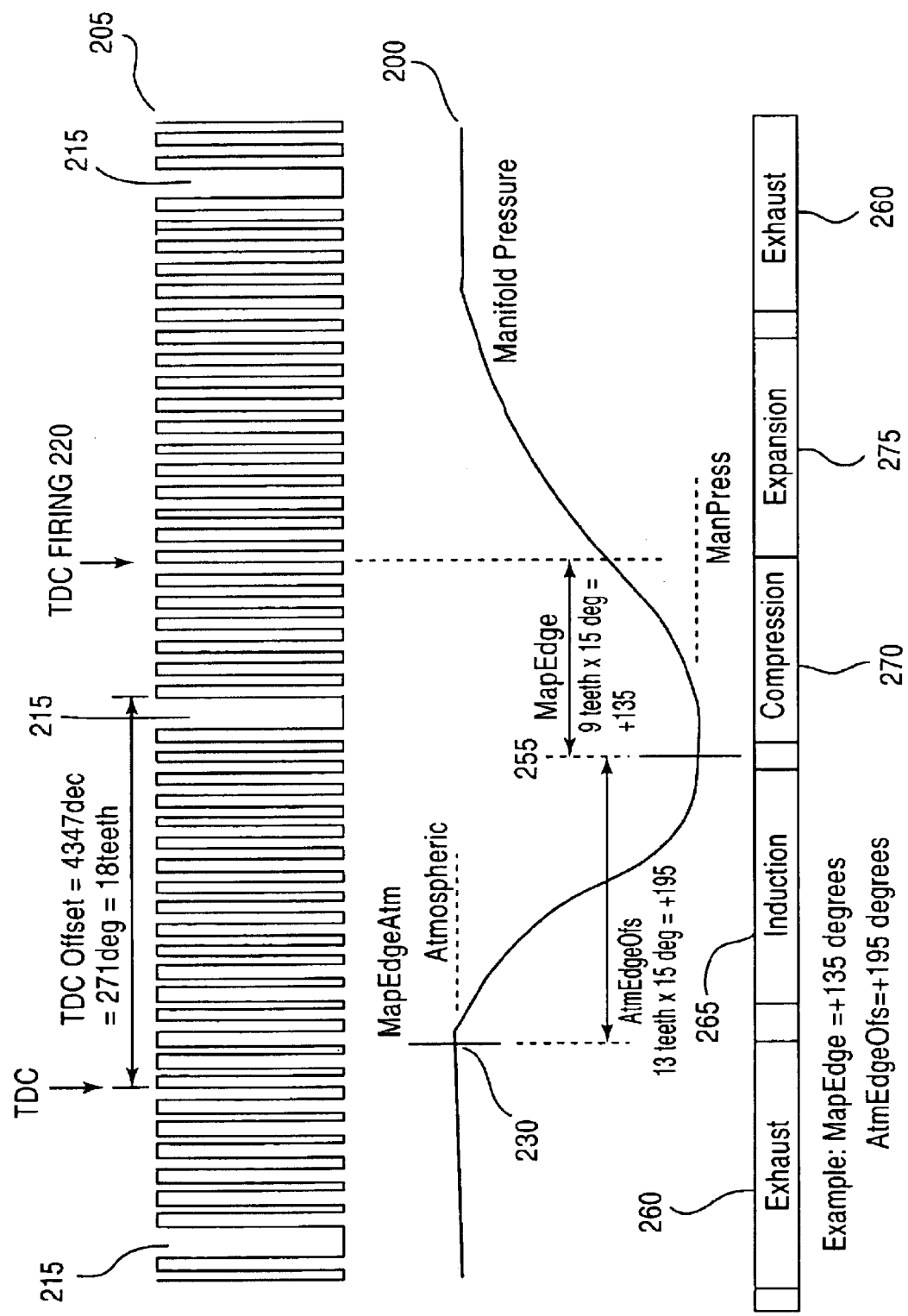
FIG. 2 is a graph plotting the absolute pressure within an inlet manifold of a four stroke engine.

Present embodiments sample the manifold absolute pressure at a predetermined crank angle where the pressure differential is anticipated to be relatively high. In this regard FIG. 2b is a representation of typical manifold pressure fluctuations over an engine cycle within the inlet manifold of a single cylinder four stroke engine, such as the manifold 165 of FIG. 1b. The absolute pressure 200 is depicted relative to engine crank angle by the crank angle signal 205. The crank angle signal is generated by the engine position sensor 115. The crank angle signal 205 consists of a series of successive square waves generated by the encoder teeth 170 on encoder wheel 166. The encoder wheel 166 also has a missing tooth that does not generate a square wave. Marker portion 215 of the crank angle signal 205 corresponds with the crank angle signal 205 generated as the missing tooth of the encoder wheel 166 passes the engine position sensor 115.

The manifold pressure signal 200 corresponds with one engine cycle of the four stroke engine 150. Accordingly the manifold pressure signal 200 is represented over two revolutions of the engine and associated engine phases, namely exhaust phase 260, induction phase 265, compression phase 270 and expansion phase 275. The manifold absolute pressure 200 is at atmospheric pressure over the exhaust phase 260 and drops below atmospheric pressure over the induction phase 265, compression phase 270 and expansion phase 275.

The TMAP sensor 107 is sampled at MAP Sample crank angle 255 which corresponds with minimum absolute pressure within inlet manifold 165. MAP sample crank angle 255 for the engine operating conditions of FIG. 2b corresponds with one hundred and thirty five degrees before top dead center (TDC) firing, which is the TDC that occurs near the transition between compression phase 270 and expansion phase 275.

To provide altitude compensation for land vehicles, the TMAP sensor 107 is also sampled at Atmospheric Sample crank angle 230 which corresponds with a crank angle at which the absolute pressure in the inlet manifold 165 corresponds with atmospheric pressure. Under the engine operating conditions depicted in FIG. 2b, the Atmospheric Sample crank angle 230 occurs at two hundred and thirty degrees before TDC firing 220 during the exhaust phase 260, which corresponds with one hundred and ninety degrees of crank angle before MAP Sample crank angle 255.

Referring now to FIGS. 3a to 3d which are pressure traces of manifold absolute pressure against crank angle for a high output two stroke engine of the type discussed in relation to FIGS. 1c and 1d.

Figure 3A:
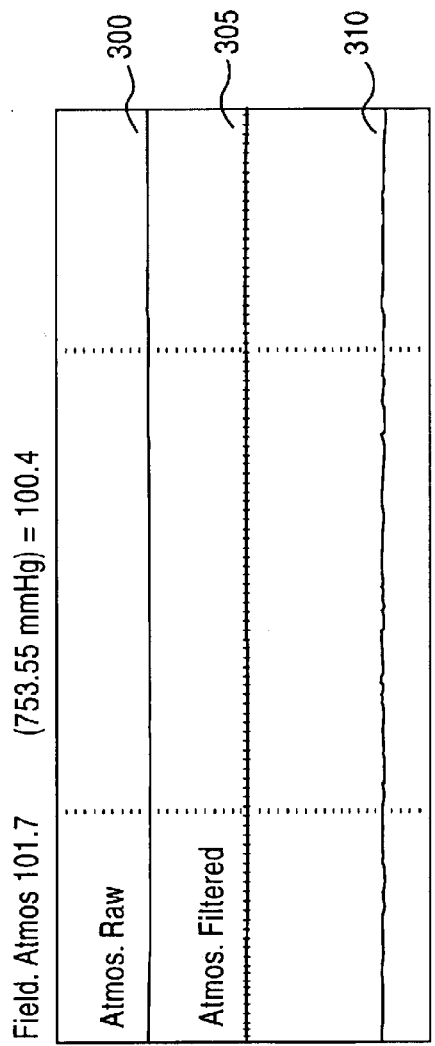
FIG. 3a is a graph plotting atmospheric pressure as measured by a MAP sensor when an engine is not active.

FIG. 3a depicts a measurement of atmospheric pressure taken from a MAP sensor of an engine when the engine is in a stalled state. The measurement depicts three signals MAP RAW 300, MAP FILTERED 305 and CRANK 310. MAP RAW 300 is the unfiltered output of a MAP sensor. MAP FILTERED 305 is the MAP RAW 300 signal after filtering so as to be suitable for sampling by an analogue to digital converter on an input to an ECU such as ECU 11 of FIG. 1a. CRANK 310 is a square wage generated by an engine encoder system consisting of an encoder wheel located on an engine flywheel and a position sensor, such as the encoder wheel and position sensor discussed in relation to FIG. 1a. As the engine is in a stalled state for FIG. 3a, the encoder wheel is not rotating and so the CRANK signal is not a square wave.

Figure 3B:
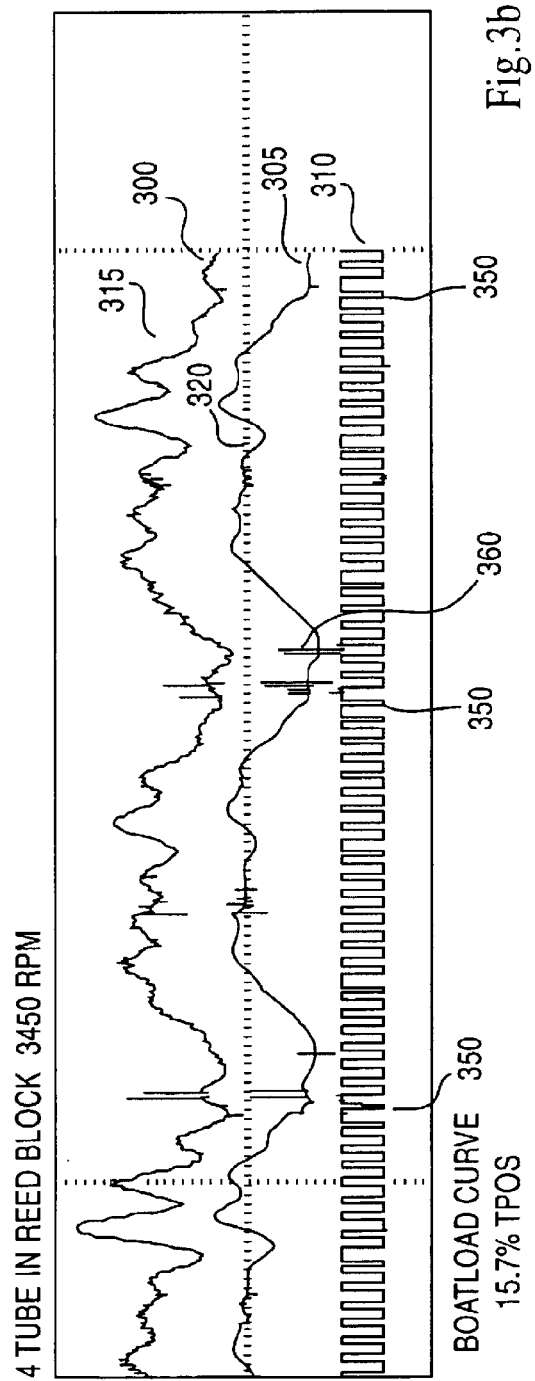
FIG. 3b is a representative graph plotting inlet manifold pressure of a two stoke engine at 3450 RPM at 15.7% throttle angle.

FIG. 3a details atmospheric pressure levels that corresponding to the MAP RAW 300 and MAP FILTERED 305 signals of FIGS. 3b–3d. It also depicts a typical engine start-up procedure for a vehicle whereby an atmospheric pressure signal from a MAP sensor is sampled successively by an ECU prior to cranking of the engine. These successive samples are then averaged by the ECU and the resultant value is stored as the atmospheric pressure value that is then used in calculations of mass air flow to an engine.

FIG. 3b is a manifold absolute pressure signal measured for an inlet manifold of a two stroke crank case scavenged engine having separate inlet reed valves and throttle for each inlet runner. The signal was measured for engine operating conditions of 3450 RPM and 15.7% throttle angle (i.e. the throttle was open 15.7%). The CRANK signal 310 is a square wave generated by an encoder wheel having a non-uniform tooth pattern that translates into a square wave having a non-uniform duty cycle. This enables the position of the engine to be determined with relative speed compared with an encoder wheel having a uniform tooth patter. Cycle Marker 350 is a portion of the CRANK signal 310 that has two relatively wide square waves adjacent each other. Cycle Marker 350 can be used to distinguish between separate revolutions of the engine and hence between separate engine cycles for a two stroke engine.

A review of MAP RAW 300 and MAP FILTERED 305 relative to the various occurrences of Cycle Marker 350 indicates that the pressure fluctuations within the inlet manifold are relatively repeatable on a cycle to cycle basis when viewed from a crank angle perspective.

Atmospheric pressure for the MAP RAW 300 signal is designated as 315 and is designated as 320 for the MAP FILTERED 305 signal. It can be seen that in contrast to the manifold absolute pressure signal for the four stroke engine of FIG. 2, the manifold absolute pressure of the two stroke engine exceeds atmospheric pressure at at least one area of the engine cycle.

FIG. 3c depicts MAP RAW 300 and MAP FILTERED 305 for the engine of FIG. 3b at engine operating conditions of 5850 RPM and 62.7% throttle angle. It can be seen that the pressure wave in the inlet manifold has a different form to that of: FIG. 3b however its pattern repeats from engine cycle to engine cycle as measured between Cycle Markers 350. Similarly FIG. 3d depicts absolute manifold pressure for the same engine as for FIGS. 3b and 3c at 6750 RPM and 100% throttle angle. Again the pressure wave in the inlet manifold repeats on a cycle to cycle basis as measured between Cycle Markers 350.

In each of FIGS. 3b, 3c, and 3d the MAP FILTERED signal 305 is sampled by the ECU at Sample Point 360 which corresponds with a sample occurring at two teeth after Cycle Marker 350. Accordingly, even though the engine operating conditions may vary, it is possible in the embodiment depicted for FIGS. 3b–3d to sample MAP FILTERED signal 305 at the same crank angle each engine cycle even though this may not correspond with the lowest absolute pressure within the manifold on a particular cycle.

In alternate embodiments, encoder tooth edge used for any particular sampling of the MAP sensor may be looked up from an ECU table (often referred to as an ECU map) of engine speed or throttle position.

As the encoder tooth edge which provides timing for sampling of the MAP sensor may be looked up from an ECU map, it can be seen that the crank angle used for sampling the MAP Sample 255 and the Atmospheric Sample 230 may vary depending on engine operating conditions such as engine speed and/or throttle position. Should an encoder tooth edge, newly designated by an ECU map, have already passed a tooth edge sensor of the crank angle encoder when the MAP sensor is read, then the MAP sensor sample is preferably taken at the next encoder tooth.

The ECU map of encoder tooth edges for sampling manifold absolute pressure and atmospheric pressure may be determined during calibration of the engine, by analysing pressure traces for the engine under various engine operating conditions.

Once atmospheric and manifold absolute pressure have been determined, the mass airflow rate to an engine may then be determined by the following equation:

$$\text{Mass Air} = \frac{PMAN2 \times VCF \times N}{PATM \times (TMAN + 273) \times R \times 10}$$

where:
Mass Air=mass airflow rate (g/s);
PMAN=manifold absolute pressure (kPa)
PATM=atmospheric pressure (kPa);
N=engine speed (RPM);
TMAN=manifold temperature (Co);
R=universal gas constant=287;
VCF=volume correction factor.

Once the MAP sensor has been sampled and a measure of manifold pressure, atmospheric pressure, engine RPM and manifold temperature have been determined, the ECU can then calculate mass airflow rate as per the formula herein. It should be noted that manifold temperature may be measured either by a TMAP sensor or by a discrete temperature sensor. Other variables such as the volume correction factor may be determined from a VCF map which plots VCF against engine speed and engine throttle angle. This Map will also take into account that the manifold absolute pressure is sampled at a predetermined crank angle, and that the calculation is not based on an average manifold absolute pressure. The VCF map may also be determined during engine calibration.

Volume correction factors (VCF) may be calculated using the formula $$VCF=(VolEff \times CylVolume)/R$$

Where:
VolEff=Volumetric Efficiency(%)
CylVolume=Volume of each cylinder (ml)
R=Universal gas constant of air=0.287 (kJ/kg °K).

Constants such as the universal gas constant and temperate in degrees Kelvin may be looked up from a table in ECU memory.

It may be necessary for the output of the MAP sensor to be filtered by the ECU of before it is used in further ECU calculations.

The measurement of Mass Air above may be filtered by the ECU according to the process of the following pseudo code:

| | |
|---|---|
| IF | (This is the first "Mass Air" measurement taken after cranking has finished): |
| THEN | "Mass Air Filtered" = "Mass Air measured"; |
| ELSE | "Mass Air Filtered" = "Mass Air Filtered" + ("Mass Air measured" − "Mass Air Filtered") × "Mass Air Filtered"; |
| END IF. | |

As detailed in FIG. 3a it is preferable that the MAP sensor is utilised prior to engine cranking to obtain a reading of atmospheric pressure. Preferably the measurement is repeated a number of times to ensure that a representative sample of atmospheric pressure is achieved. Cranking of the engine is preferably delayed until this representative number of samples is recorded. This measurement of atmospheric pressure prior to cranking can provide for the introduction of altitude compensation into ECU maps, such as fuel per cycle maps and airflow maps.

An ECU, such as ECU 11 of FIG. 1a, is configured as a real time system to ensure performance of certain operations every engine cycle. These operations are events such as actuation of fuel injectors and sparking events. These events must happen every engine cycle in order for the engine to continue operating. Other events such as sampling manifold pressure and atmospheric pressure may also be scheduled to occur every engine revolution. Sampling of the MAP sensor is scheduled to occur at one or one of a number of pre-determined crank angle every engine cycle and so is said to be synchronous with crank angle. Actuation of the fuel injector may be scheduled to commence and end with crank angle, however it may also be scheduled to commence with crank angle and to end a fixed time period later. Hence actuation of the fuel injector may be synchronous with crank angle but de-activation may be asynchronous with crank angle for the same fuelling event. Other events such as sampling air temperature in the inlet manifold may be scheduled to occur at regular time intervals and thereby be asynchronous with engine crank angle.

As detailed herein the MAP sensor may be sampled twice per engine cycle at predetermined crank angles. One sample is to determine manifold absolute pressure and the other sample is to measure atmospheric pressure. Such ongoing measurement of atmospheric pressure is useful for altitude compensation on land vehicles, such as scooters and motor-cycles and in particular vehicles with single cylinder engines, whether two stroke or four stroke, As detailed above, the samples of manifold pressure may be filtered via a software routine referred to as a digital filter. In this regard a first order digital filter may be implemented within the ECU 11. Samples of atmospheric pressure may also be filtered in a similar manner to the samples of manifold pressure.

Once sampled and filtered the updated value for manifold pressure is stored within the ECU 11. Accordingly the value for manifold pressure used in calculating air flow may be updated ever engine revolution. Atmospheric pressure may be sampled and filtered every engine revolution, however the update rate of this variable in the ECU may occur over a longer time period of one half second or longer thereby ensuring greater averaging of cycle to cycle variations in sample values of atmospheric pressure compared with updating the value of atmospheric pressure every engine cycle. Alternatively the ECU may require a change of predetermined magnitude in the filtered value of atmospheric pressure before updating the variable in the ECU that represents atmospheric pressure. Such predetermined magnitude may be 0.5 Kpa or 1.0 Kpa or greater.

In certain applications a fixed correlation between MAP Sample crank angle 255 and Atmospheric Sample crank angle 230 may be identified across all or some of the possible engine operating conditions. Such fixed correlations allows Atmospheric Sample crank angle 230 to be specified as an off-set relative to MAP Sample crank angle 255. For example the off-set may be constant across all throttle angles or the off-set may be specified as a series of discrete values ranging from around 135° at certain low throttle angles up to 210° at high throttle angles. In some applications it has been possible to utilise only three or four values that characterise the required off-sets over all throttle angles. Similar relationships between MAP Sample crank angle 255 and Atmospheric Sample crank angle 230 may be identified across the engine speed range.

In the embodiments of FIGS. 1a and 1b for example, engine speed can reach levels in excess of 10,000 RPM which represents one engine revolution every 6 ms (milli-seconds). For a two stroke application this means one engine cycle every 6 ms or less at these higher RPMs. It is possible for some ECU's to perform all necessary calculations, such as air flow calculations, and other control strategies every 5 or 6 ms. Some low cost applications however, such as scooter applications, may only be able to perform these calculations and control strategies every 20–30 ms. Accordingly for engine speeds greater than approximately 2000 RPM it may not be possible to complete all calculations and control strategies within one engine cycle for a two stroke application.

Where such calculations and control strategies take longer than one engine cycle to perform, the calculations are said to occur in a background loop. The background loop is interrupted by a foreground loop. The foreground loop controls actuation of fuel injectors, spark events and sampling and filtering of signals from MAP sensors. Accordingly the foreground loop can be said to be synchronous with crank angle whereas the background loop can be said to be asynchronous with crank angle.

As a typical background loop for a low cost application may take between 20–30 ms, some low cost applications may only re-calculate mass air flow every 20–30 ms which represents every 3 or 4 engine cycles for a two stroke application. However as the manifold pressure is sampled and updated every engine revolution, the ECU takes into account the latest data samples from the MAP sensor when the value for mass air flow is re-calculated. Accordingly it can be seen that whilst mass air flow may be calculated asynchronously with crank angle, when the calculation is performed, the manifold pressure variable that is used is the latest synchronous variable. In this way time lags within calculations performed by the ECU are kept to a minimum.

The present embodiments have detailed a manner in which air flow to an engine with small inlet manifold volume can be determined. In particular certain embodiments sample manifold absolute pressure at predetermined crank angles having regard to instantaneous engine speed and/or load conditions. Air flow to both two stroke and four stroke engines may be determined in accordance with these embodiments. An alternative application for the embodiments herein is the provision of an electronic throttle as a replacement for a mechanically actuated throttle particularly for high performance engines and engines with small plenum inlet manifolds. Electronic throttles require accurate airflow measurements to ensure correct operation, for example by means of a feedback control strategy. In accordance with the above, modifications and variations as would be deemed to be obvious to the person skilled in the art are included within the ambit of the claims appended hereto.

What is claimed is:

1. A method of measuring the air flow in an engine, the engine having an intake manifold, the method including the steps of:

selecting a pre-determined crank angle from a plurality of predetermined crank angles at which to sample manifold absolute pressure in said intake manifold;

sampling the manifold absolute pressure in said intake manifold at said predetermined crank angle; and determining the airflow as a function of atmospheric pressure and the manifold absolute pressure at said crank angle.

2. A method according to claim 1, wherein the selection of said pre-determined crank angle for sampling said manifold absolute pressure is dependent on at least one of engine speed or engine throttle position.

3. A method according to claim 1, wherein the selection of said pre-determined crank angle for sampling said manifold absolute pressure is dependent on at least one of engine speed or engine throttle position and wherein said predetermined crank angle is selected such that said sampling of said manifold absolute pressure occurs at or near the maximum pressure fluctuation from atmospheric pressure within the intake manifold.

4. A method according to claim 1, wherein said selection occurs at least once per engine cycle.

5. A method according to claim 1, wherein said calculation of air flow occurs asynchronously with engine operation.

6. A method according to claim 1, wherein said selection occurs at least once per engine cycle and wherein said calculation occurs asynchronously with engine cycle.

7. A method according to claim 1, wherein said predetermined crank angles are determined by calibration.

8. A method according to claim 1, wherein said engine further comprises a combustion chamber with a swept volume wherein said inlet manifold has volume less than twice the swept volume of the combustion chamber.

9. A method according to claim 1, wherein said engine is a single cylinder engine.

10. A method according to claim 1, wherein said engine comprises two cylinders, each having an inlet manifold with a volume less than two swept volumes of their respective cylinders and wherein said inlet manifolds have no common volume.

11. A personal watercraft comprising a fuel injected internal combustion engine having at least one piston adapted to, in use, reciprocate within a cylinder to thereby provide a combustion chamber, said combustion chamber having a swept volume and said engine further comprising an inlet manifold in fluid communication with said combustion chamber; said inlet manifold having a volume less than twice the swept volume of the combustion chamber; said inlet manifold intermediate a throttle and an inlet valve; said inlet manifold locating a pressure sensor and said watercraft further comprising an electronic control unit adapted to sample said pressure sensor at a predetermined crank angle and thereby determine manifold pressure at said crank angle and to calculate mass air flow to said engine as a function of said manifold pressure at said crank angle.

12. A personal watercraft as claimed in claim 8 wherein said engine has two cylinders each having an inlet manifold wherein each said inlet manifold has a volume less than two swept volumes of their respective cylinder, said inlet manifolds having no common volume.

13. A personal watercraft as claimed in claim 11 wherein said electronic control unit is further adapted to select said crank angle at which to measure said manifold pressure from a plurality of predetermined crank angles.

14. A personal watercraft as claimed in claim 13 wherein said selection is dependent on at least one of engine speed and engine throttle position.

15. A personal watercraft as claimed in claim 11, wherein said electronic control unit calculates air flow asynchronously with engine crank angle in background processing operation.

16. A scooter comprising a fuel injected internal combustion engine having at least one piston adapted to, in use, reciprocate within a cylinder to thereby provide a combustion chamber, said combustion chamber having a swept volume and said engine further comprising an inlet manifold in fluid communication with said combustion chamber; said inlet manifold having a volume less than twice the swept volume of the combustion chamber; said inlet manifold intermediate a throttle and an inlet valve; said inlet manifold locating a pressure sensor and said scooter further comprising an electronic control unit adapted to sample said pressure sensor at a predetermined crank angle and thereby determine manifold pressure at said crank angle and to calculate mass airflow to said engine as a function of said manifold pressure at said crank angle.

17. A scooter as claimed in claim 16 wherein said electronic control unit is further adapted to select a crank angle at which to measure said manifold pressure and wherein said selection is made from a plurality of predetermined crank angles.

18. A scooter as claimed in claim 16 wherein said electronic control unit in use at least at higher engine speeds, is adapted to measure manifold pressure synchronously with crank angle and to calculate mass air flow to said engine asynchronously with crank angle in a background processing loop.

19. A scooter as claimed in claim 16, further adapted to measure atmospheric pressure at a predetermined crank angle and to calculate air flow to said engine as a function of said atmospheric pressure and as a function of said manifold pressure.

20. A scooter as claimed in claim 16, wherein said engine is a single cylinder engine.

21. An electronic control unit (ECU) for use with an engine having an inlet manifold intermediate a throttle and an inlet valve and said inlet manifold having a pressure sensor; said ECU adapted in use to measure manifold pressure at a predetermined crank angle and to calculate air flow to said engine as a function of manifold pressure at said crank angle wherein at least at higher engine speeds said mass air flow to said engine is calculated asynchronously with crank angle.

22. An ECU as claimed in claim 21 further adapted to select a crank angle at which to measure manifold pressure wherein said selection is from a plurality of predetermined engine crank angles.

23. An ECU as claimed in claim 22 wherein said selection is dependent on at least one of engine speed and throttle position.

24. An ECU as claimed in any one of claim 21, wherein said ECU is adapted to measure manifold pressure in a foreground loop and to calculate air flow to said engine in a background loop wherein said background loop uses a least the latest measured value of manifold pressure to calculate said air flow.

25. An ECU as claimed in claim 24 wherein said latest measured value of manifold pressure used to calculate said air flow is a filtered value.

26. An ECU as claimed in claim 21 and further adapted to measure atmospheric pressure at a predetermined crank angle and to calculate air flow to said engine as a function of said atmospheric pressure.

27. An ECU as claimed in claim 26 further adapted to select crank angles at which to measure manifold pressure and atmospheric pressure dependent on at least one engine operating condition.

28. An ECU as claimed in claim 27 wherein said at least one engine operating condition is one of engine speed and throttle position.

29. An ECU as claimed in claim 28 further adapted to measure atmospheric pressure at a predetermined crank angle wherein said measurement occurs at periodic time intervals.

30. An ECU as claimed in claim 21, wherein said ECU is further adapted for operation with a single cylinder engine.

31. An ECU as claimed in claim 21, wherein said ECU is further adapted for operation with an engine having an inlet manifold volume less than twice a swept volume of said engine.

* * * * *